Jan. 25, 1966  L. SAIR  3,231,392
METHOD OF CURING MEAT
Filed Dec. 2, 1964  2 Sheets-Sheet 1

Inventor
Louis Sair
by W. Bartlett Jones,
Attorney

Jan. 25, 1966  L. SAIR  3,231,392
METHOD OF CURING MEAT
Filed Dec. 2, 1964  2 Sheets-Sheet 2

Inventor
Louis Sair
by W. Bartlett Jones,
Attorney

United States Patent Office 3,231,392
Patented Jan. 25, 1966

3,231,392
METHOD OF CURING MEAT
Louis Sair, Evergreen Park, Ill., assignor to The Griffith Laboratories, Inc., Chicago, Ill., a corporation of Illinois
Filed Dec. 2, 1964, Ser. No. 415,227
15 Claims. (Cl. 99—159)

The present application is a continuation-in-part of Serial No. 330,018, filed December 12, 1963, now abandoned, as a continuation-in-part of Serial No. 246,539, filed December 21, 1962, now abandoned.

The present invention relates generally to treating meat to improve its water-binding capacity. In particular, it relates to the cured meats.

In processing meat, particularly whole meat or canned meat products which are cooked in containing molds or in sealed cans, there is a tendency for the meat to shrink and purge aqueous material which collects as a gelatinous mass between the shrunken meat mass and the walls of the mold or can. To minimize this tendency, one or more mildly alkaline salts of phosphorus acids, such as pyrophosphoric, metaphosphoric and polyphosphoric acids, have been incorporated with the sodium chloride used in the processing, with or without curing salts. When curing salts are used it is also customary to include an ene-diol compound, such as an isomer of ascorbic acid or a water-soluble salt thereof. The ene-diol compound stabilizes the color of cured meat. The term "phosphate" as used herein and in the meat industry, contemplates salts of orthophosphoric acid and salts of molecularly dehydrated phosphoric acid.

Fresh meat contains lactic acid which develops after slaughter, giving the meat a pH normally in the range from 5.5 to 6.2. The said mildly alkaline salts of phosphoric acid are so chosen that they are effective to neutralize at least some of the lactic acid and elevate the pH toward pH of 7. This elevation of the pH increases the water-binding capacity of the meat, thus minimizing purging when cooked.

One disadvantage of the phosphates is that residual phosphate salt within the meat has an effect on the taste of the meat, thus limiting the amount that should be used. Another and related disadvantage is the migration of said content from the meat to the surface on drying, as in the smokehouse, the migrated salt including the phosphate residues, thus imparting an undesirable surface taste and appearance. Certain desirable phosphate salts cannot be used in a pickle liquor in the desired amounts because the salinity of the brine presents dissolution of the desired amount. For example, in a case where 27 pounds of a certain phosphate are permitted by control authority, in 50 gallons of pickle to be used for pumping to 10% increased weight of the meat, the salting-out effect can be so great that not more than 16 pounds of the phosphate may be used.

In my copending application Serial No. 415,228, I have described incompatibilities between a meat-treating brine and alkaline materials useful in meat in such brine. One type of incompatibility is the inability to dissolve desired quantities of certain alkaline phosphate salts in a brine of a desired concentration of sodium chloride. Another type of incompatibility is the result of using a commercial grade of sodium chloride, as from rock salt, which introduces calcium ions into the brine, which from turbidity and which are precipitated by one or more of other desirable ingredients of a pickle liquor, namely, orthophosphate salts, pyrophosphate salts, carbonate salts, and alkali-metal hydroxides. According to that application the pickle liquor is provided in two solutions, one containing substantially all of the calcium-providing sodium chloride, and the other containing substantially all of the calcium precipitant.

When meat is to be cured by use of sodium nitrite or nitrate or both, provided in the pickle liquor, it is also a practice to provide an ene-diol compound which is an antioxidant effective to accelerate and improve the cure. Such ene-diol compound can be dissolved in either one of the two solutions, subject to certain limitations, the discovery of which is the basis of the present invention.

As stated above, there are numerous alkaline agents available for use to minimize purging. These may be divided into two classifications, namely, the high-pH agents, and the low-pH agents.

It has been discovered that ene-diol compounds, such as ascorbic acid, isoascorbic acid (erythorbic acid), and their water-soluble salts, are slowly decomposed in solutions containing high-pH alkaline agents, especially, tri-alkali-metal orthophosphate, normal alkali-metal carbonate, and alkali-metal hydroxide. It has also been discovered that such ene-diol compounds are stable in solution in the presence of low-pH alakine agents, especially di-alkaline-metal orthophosphate, alkali-metal metaphosphate, alkali-metal pyrophosphate, alkali-metal polyphosphates, and alkali-metal bicarbonate, all of which are useful as alkaline agents to minimize purging.

In consequence, when a high-pH alkali is to be used in a pickle liquor in meat, it should not be dissolved in advance in a solution containing an ene-diol compound subject to slow decomposition by it. The high-pH alkali and the ene-diol compound should be separately dissolved in different solutions to be combined substantially at the time of entering a piece of meat.

In separately dissolving the ene-diol compound and the high-pH alkali, the compatibility with other ingredients should be considered. For example, when precipitable calcium ions are present in a sodium chloride brine, the described high-pH alkalis should not be all dissolved in such brine, but all of the ene-diol compound may be so dissolved. When a purer grade of sodium chloride is used which does not provide precipitable calcium ions, then the high-pH alkaline agents may be present in the brine, provided the solubility of the desired amount is not repressed by the salt concentration.

Of the high-pH alkaline agents above described, the hydroxides and normal carbonates are preferred over the tri-alkali-metal phosphate, on account of the taste of the phosphate residue, and the hydroxide is preferred over the others on account of its leaving no salt residue.

It is the general object of the invention to provide two solutions to be combined to form a pickle liquor, one containing an ene-diol compound subject to slow decomposition in the presence of certain high-pH alkaline agents present in the other, said two solutions to be combined substantially at the time of introducing both of them into a piece of meat.

It is another object of the present invention to increase the water-binding capacity of meat not only with lesser amounts of salts of phosphorus acids, but even without any such salts.

It is a particular object of the invention to minimize shrinkage and purging by use of hydroxides and normal carbonates of alkali-metal instead of only small amounts of salts of phosphorus acids.

The alkalis used are those with edible cations, namely, sodium and potassium. The essential alkaline materials used are one or more of the normal orthophosphates, the hydroxides and normal carbonates, and it is preferred to use the hydroxides alone or mixed with a normal carbonate when in the same solution. The alkaline agents of the present invention may not in all cases be merely substituted in a pickle liquor for the various phosphate salts. When the solution contains an ene-diol compound to stabilize the color of nitrite-cured meat, such as a water-soluble salt of an isomer of ascorbic acid, for example, sodium erythorbate, the hydroxide or normal carbonate of the present invention may not be present in such solution. However, it may be present in a solution lacking such an ene-diol compound. The ene-diol compounds so used are unstable at pH levels normally resulting from the presence of said alkali-metal normal orthophosphates or carbonates or hydroxides, in the presence of which they are readily destroyed. The destruction is not instantaneous but is gradual over a short period of time which does not permit holding a supply of the liquor containing the high-pH alkali and an ene-diol compound in a tank from which to draw a constant composition from time to time as is done in commercial practice.

When meat is injected with a pickle liquor, as in the arterial pumping of hams, or in the multiple-needle-impregnation of pork bellies, the liquor on entering the meat may contain incompatible ingredients, such as sodium ascorbate and sodium hydroxide, by combining two separate solutions in measured proportion substantially at the time of introducing the liquor to the meat. This may be done by combining two liquors just prior to entering a single-passage-needle, or just prior to entering or within a manifold delivering to a bank of needles, such as are used for pork bellies, or in the meat by use of a two-passage-needle, or by using two side-by-side single-passage-needles, or by stitch-pumping at separate multiple-needle injection stations, along a conveyor carrying a stream of meat pieces to be treated. In so doing, one solution may contain sodium ascorbate or its equivalent ene-diol compound, and the other may contain the strong alkali such as the normal phosphate, carbonate or hydroxide of sodium or potassium or a mixture of them. The alkali is neutralized by the meat before it has time to destroy the ene-diol compound.

Carbonates function for the neutralization purposes mentioned, but in some cases are undesirable because generation of carbon dioxide forms pinholes in the meat. When the water or solution in which the salt composition of the present invention is dissolved contains precipitable calcium ions deriving from commercial sodium chloride, and containing a phosphate, or carbonate or hydroxide, the composition may precipitate calcium thus rendering the liquid undesirably turbid, but not impaired in function. Precipitation and loss of the ene-diol compound may be avoided by placing the alkaline precipitant in one solution and the sodium chloride and the ene-diol compound in the other solution.

The two solutions referred to are drawn from storage tanks, each containing stable materials. These solutions are made by operators combining measured volumes of water with weighed amounts of supplied solid compositions. For example, one solution may contain all the ingredients used for curing, such as sodium chloride, sodium nitrite, sodium nitrate, sodium erythorbate, buffering agent, and any optional content of sugar or seasoning material, and the other may contain sodium hydroxide alone, or with all or part of all the ingredients except the ene-diol compound. The latter may be alone in its liquor or combined with all or part of all the ingredients except the high-pH alkalis.

Although the sodium ion is preferred for the alkaline agents as well as for any other agents used with meat, it is known that potassium compounds have long been used. It is known that potassium compounds tend to introduce bitterness to the meat. In fact, in practicing the present invention, the use of potassium hydroxide as all of the alkaline agent makes the meat undesirably bitter. In view of these facts, potassium compounds are not barred, but when used, are judiciously mixed with sodium compounds in proportions to avoid undesirable bitterness. Such mixtures apply not only to the alkaline agents but may involve proper selection of alkali nitrite and alkali nitrate.

To illustrate the effect of strong alkali on the ascorbic value of a curing pickle containing sodium erythorbate, Liquor No. 1 was made in proportion as follows.

| Ingredient: | Percent |
|---|---|
| Water | 78.5 |
| Sodium chloride | 15.85 |
| Cane sugar | 4.69 |
| Sodium nitrite | 0.151 |
| Sodium nitrate | 0.112 |
| Sodium hydroxide | .56 |
| Sodium erythorbate | .235 | pH=11.6.

In preparing the above at 40° F. the last ingredient added was the sodium erythorbate. After 15 minutes, the content of the sodium erythorbate was immediately determined in one gram of pickle to be 1.03 mg. as against 2.43 mg. initially added, showing a loss of 58%.

The extent of destruction of the sodium erythorbate in a given time increases with the increased content of sodium hydroxide. Pickles were made similar to that described above with varying amounts of sodium hydroxide. After one hour, the ascorbic content was determined as shown below.

| Lbs. of NaOH in 50 gallons of pickle | pH of pickle | Percent of sodium erythorbate remaining |
|---|---|---|
| 3.0 [1] | 11.6 | 35 |
| 1.50 | 11.6 | 62 |
| .75 | 11.4 | 80 |
| .3 | 11.0 | 91 |

[1] The amount present in Liquor No. 1.

Tests made with a pickle having 3.5 lbs. of sodium hydroxide per 50 gallons show less purging of hams than is produced using a corresponding liquor with 16 lbs. of sodium tripolyphosphate per 50 gallons of pickle pumped to 10% increase of weight of the meat.

The following dry composition was prepared using sodium hydroxide and sodium bicarbonate as the alkali.

| Ingredient: | Percent |
|---|---|
| Sodium nitrite | 4.6 |
| Sodium nitrate | 3.4 |
| Sodium chloride[1] | 69.2 |
| Sodium hydroxide | 8.5 |
| Sodium bicarbonate | 14.3 |
| | 100.0 |

[1] Calcium-free.

A pickle having a pH of 10.25 was prepared using this dry composition according to Liquor No. 1, containing 35 pounds per 100 gallons, except that the sodium erythorbate was added last in proportion of 2.5 pounds per 100 gallons of pickle. After one hour, 82% of the erythorbate remained.

The destructive effect of a combination of an ascorbate salt and a strong alkali may be disregarded by maintaining each separately in a stable solution, alone or with other ingredients commonly used in pickle liquors. Sodium erythorbate is suitably stable when it is the only solute in water. The following Example 1 shows a liquor in two parts which, when combined as described, constitute a complete curing pickle.

EXAMPLE 1

|  | Part 1 lbs. | Part 2 lbs. |
|---|---|---|
| Water | 748 | 83.4 |
| Sodium chloride [1] | 186 |  |
| Sodium nitrite | 1.9 |  |
| Sodium nitrate | 1.2 |  |
| Cane sugar | 34.6 |  |
| Sodium hydroxide | 6 |  |
| Sodium erythorbate |  | 2.5 |
| Total | 977.7 | 85.9 |
|  | pH=12.9 | pH=7.78 |

[1] Calcium-free.

Part 1 makes 100 gallons and Part 2 makes 10.2 gallons.

The stability of Part 2 was checked and found to be as follows:

Hours later:              Percent remaining
0 ------------------------------------------- 100
1 ------------------------------------------- 100
2 ------------------------------------------- 96
3 ------------------------------------------- 96

To test the short-time stability of the pickle liquor combining Parts 1 and 2, the following procedure was used:

At zero time, 50 volumes of Part 1 and 5 volumes of Part 2 were mixed, then at given intervals thereafter in separate portions of the mixture, acid was added to effect a pH of 8 to 8.5 for arresting the destruction by strong alkali. The loss of ascorbate value was determined. The results were as follows:

Seconds later:            Percent loss of ascorbic value
15 ------------------------------------------- 30
30 ------------------------------------------- 60
60 ------------------------------------------- 85
180 ------------------------------------------ 95

From the foregoing it was found that two solutions which together make a pickle liquor, can be combined for short periods without appreciable destruction of ascorbic value contained in one liquor by strong alkali contained in the other liquor. Thus, two such liquors may be combined at the inlet end of a single-orifice injection needle, or even in a conduit ahead of said inlet. Since needles are idle for short periods between use on large quantities of meat bodies such as hams, the liquor standing in the conduit after combination may lose value. Accordingly, the path traveled after combination should be made as short as practicable to minimize loss of ascorbic value in combined liquor, which may be stagnant after combination. By the use of injection needles with two passageways therethrough, or double needles, no destruction can occur. In single-passage-needles, the union is preferably effected in a conduit or manifold shortly before reaching the needle, or at the entrance to the needle. The passage for the combined liquids in the conduit or needle should be small to limit a combined volume which may be stagnant.

However, the invention is applicable to the stitch-pumping practice either at one station or at two adjacent stations. A piece of meat on a conveyer is stich-pumped to a predetermined increase in weight by a controlled injection of one solution of the present invention, and then again pumped to a second predetermined increase in weight by a controlled injection of the second solution of the present invention. The two liquids diffuse and mix within the meat to function as a single pickle liquor.

The term "substantially simultaneously" as used herein contemplates the time differentials of the commercial processing above referred to. In the two-station practice the two solutions cannot mix immediately upon injecting the second solution, since the two solutions must diffuse and mix within the tissues of the meat. Since the combined solution does not exert its function instantaneously, a moderate time interval between injections is considered to fall within the intended meaning of the term.

Two methods of injection are referred to in the drawing, in which.

Figure 1:
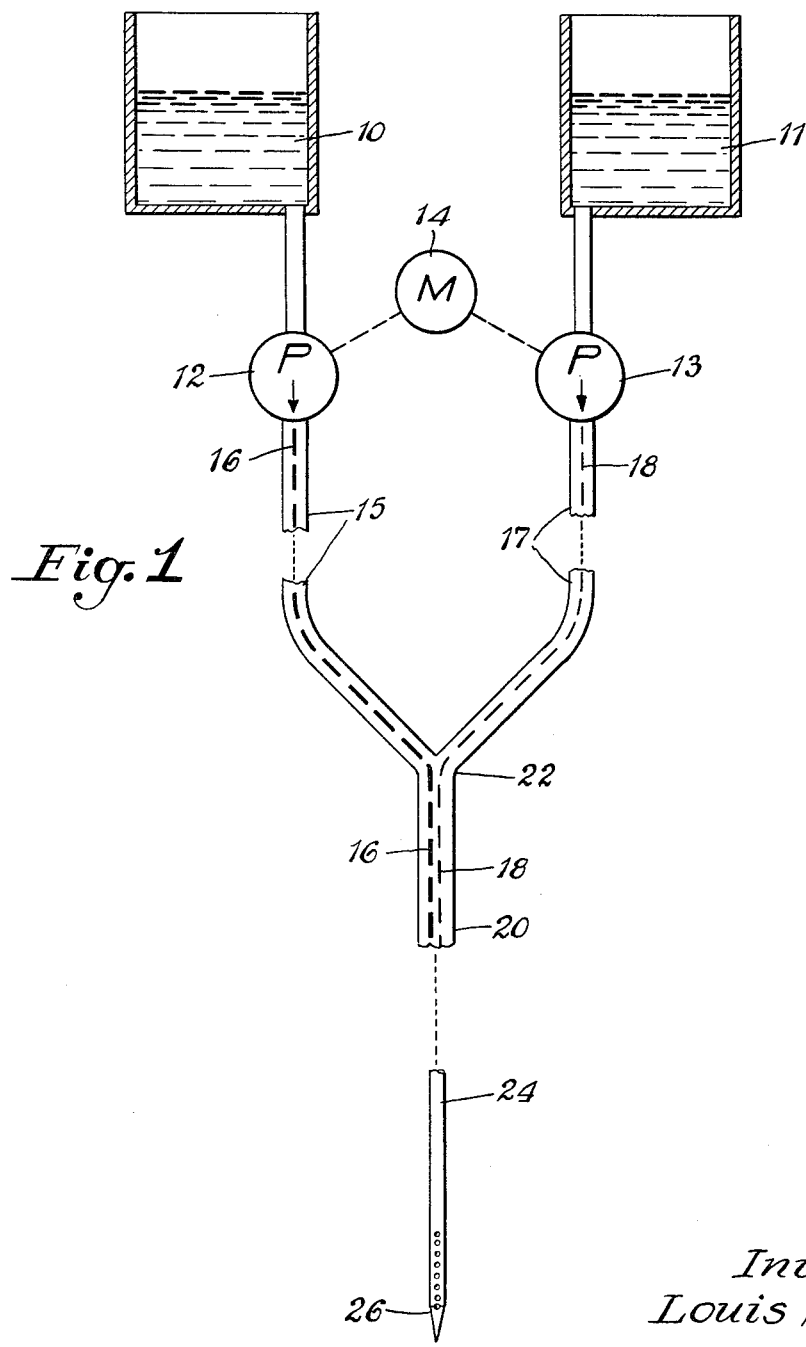
FIG. 1 illustrates diagrammatically the proportioning of two solutions for use with a needle for artery pumping.

Numerals 10 and 11 illustrate, respectively, separate supplies of the two liquors from which supplies the liquors are drawn to proportioning pumps 12 and 13 operated in synchronism as indicated by a common motive source 14. Pump 12 delivers into conduit 15 successive increments 16 of liquor from supply 10. These increments are illustrated by relatively long and heavy lines.

Pump 13 delivers into conduit 17 increments 18 from supply 11. The increments 18 are illustrated by lines which are shorter and lighter than the lines indicating increments 16, thus to indicate that the content of increments 16 is greater than the content of the increments 18.

The proportioning pumps 12 and 13 are standard commercial items which may be operated so that the increments 16 alternate in succession with increments 18. They also may be operated so that the alternating increments 16 and 18 overlap to predetermined extents.

Conduits 15 and 17 are illustrated as combining their contents in a conduit 20 in which the increments 16 are illustrated as overlapping with the increments 18. The confluence of the two liquors indicated by the numeral 22 is located very close to the end of a discharge needle 24 such as is conventionally used in artery pumping of hams. The travel distance from the confluence 22 to the discharge end 26 of the needle 24 is controlled and made short as predetermined by the slow reaction time between the two liquors, so that substantially no change takes place in the combined liquor within the conduit 20 and the needle 24. Within the meat the alkali is neutralized by the meat before it is effective to reduce the content of the ene-diol compound.

To point out the versatility of the present invention, it is reiterated that it is the alkali contacting the meat that is effective. Alkalis useful for the purpose include some of lower pH not detrimental to the presence of the ene-diol material, and others of higher pH which are detrimental. Among the low-pH alkalis are alkali-metal bicarbonate, the metaphosphates, the pyrophosphates, the polyphosphates, and the di-alkali-metal orthophosphates. Among the higher pH ones are the hydroxides and normal carbonates of alkali-metal, trisodium phosphate and tripotassium phosphate. Since the tri-alkali-metal phosphates hydrolyze in water to the corresponding di-salt and the corresponding hydroxide, the hydroxide and the di-salt are preferred over the tri-salt since their proportions may be easily varied from the fixed proportions of the tri-alkali-metal phosphates alone.

In providing alkali to the meat, it is preferred to use no salts of a phosphorus acid, but these are not ruled out so long as one or more of the said higher-pH alkalis is supplied in one solution and the ene-diol compound in another. Thereby, when and if one or more of the phosphorus acid salts is used, it is not necessary to use an undesirable quantity thereof.

Example 2 gives a composition of a liquor for introducing alkali which contains disodium phosphate. Disodium phosphate is a low-pH alkali which can exist in a pickle with sodium erythorbate. However, disodium phosphate has a limited solubility in a curing pickle and cannot be used in sufficient concentration to provide all the alkali. By substituting a portion of the disodium phosphate with a strong alkali such as sodium hydroxide, a commercial pickle can be obtained with all of the phosphate in solution.

EXAMPLE 2

| | Parts by weight |
|---|---|
| Sodium chloride [1] | 39.7 |
| Sodium nitrite | 4.6 |
| Sodium nitrate | 3.4 |
| Sodium hydroxide | 8.5 |
| Disodium phosphate duohydrate | 43.8 |
| Total | 100.0 | pH=10.6.

[1] Calcium-free.

The 35 lbs. of the above composition made up to 100 gallons of pickle resulting in 3 pounds of sodium hydroxide and 15.6 pounds of the phosphate salt, which latter is completely in solution at 40° F., using in addition 166.4 pounds of sodium chloride, 25 pounds of cane sugar and 748 pounds of water. This is called Part 1. A second solution Part 2 was prepared containing 83.4 pounds of water and 5 pounds of sodium erythorbate.

In use by dual pumping according to FIG. 1, liquors from Parts 1 and 2 are used in proportion, respectively, of 10 and 1 volumes per 100 pounds of meat, when pumping to 10% increase in weight.

Few packers use calcium-free sodium chloride, but use a lixiviated brine from rock salt which contains calcium ions. The formulation of Example 2 above using such sodium chloride produces an undesirable precipitate, especially troublesome in multiple-needle injection. When such a precipitate is effected, Example 2 is changed as follows:

EXAMPLE 3

| | Parts by Weight | |
|---|---|---|
| | Part 1 | Part 2 |
| Sodium chloride | 180 | |
| Sodium nitrite | 1.61 | |
| Sodium nitrate | 1.11 | |
| Sodium hydroxide | | 29.8 |
| Disodium phosphate duohydrate | | 153 |
| Cane sugar | 25 | |
| Water | 748 | 83.4 |
| Sodium erythorbate | 0.5 | |

In use for 100 pounds of meat, 10 volumes of Part 1 is combined with one volume of Part 2.

The present invention is directed to packers who use calcium-free sodium chloride and also to those who use rock salt which introduces calcium ions. In essence, the present invention requires the ene-diol compound to be in one solution and the high-pH alkaline agents in a second solution. Since the high-pH alkaline agents and the low-pH alkaline agents include many which are calcium precipitants, it is also important to keep the calcium precipitants in one solution and the calcium-containing sodium chloride in a second solution.

The following Table I shows some of the combinations which are possible. In the center are listed most of the ingredients from which selections are made for pickle liquors. At the right are columns for Solution No. 1 and Solution No. 2, in which column X indicates that the alined ingredient can be present and compatible when the sodium chloride is calcium-free. At the left, the compatibilities are less because the sodium chloride introduces calcium ions in Solution No. 1, which makes the solution incompatible with all of the alkaline agents listed, except sodium tripolyphosphate ($Na_5P_3O_{10}$).

Table I

| Solution | | | Solution | |
|---|---|---|---|---|
| No. 2 | No. 1 | | No. 1 | No. 2 |
| | | NaCl | X | X |
| 0 | X | NaCl (Ca) | | |
| X | 0 | $NaHCO_3$ | X | X |
| X | 0 | $Na_2CO_3$ | 0 | X |
| X | 0 | NaOH | 0 | X |
| X | 0 | $Na_3PO_4$ | 0 | X |
| X | 0 | $Na_2HPO_4$ | X | X |
| X | 0 | $Na_4P_2O_7$ | X | X |
| X | X | $Na_5P_3O_{10}$ | X | X |
| 0 | X | Ene-diol | X | 0 |

In large establishments, in particular where hams are canned, the processing using one solution is quite different from artery pumping. Hereinbelow, the conventional processing is described in reference to a part of FIGS. 2 and 3.

In general, a conveyer, say two feet wide, is packed tightly from side to side with flexible boned raw hams, completely to cover the conveyer surface. The conveyer carries the hams through two stitch-pumping stations, at each of which they are injected with the pickle. The number of insertions of the needles is timed with the advance of the conveyer so that a known amount of pickle is introduced. In one form of apparatus there are two staggered rows of needles across the conveyer, each row having twenty-five needles. The needles are carried on a movable cross-head so that after they penetrate the mass of hams, they move with the conveyed hams while they are in the hams, then return to the initial position for the following insertion.

In this process, the hams are greately expanded by the forced insertion of the pickle under high pressure, with the result that some liquid leaks out on leaving the first station. At the second station, the injection is duplicated with the same pickle. Then the hams are immersed in another pickle for 24 to 48 hours after which they are drained, forced into a can, sealed and cooked.

In this processing there are limitations on the composition of the pickle, as described above, due to repressed solubility in some cases, and due to the formation of precipitate when using the said impure salt grades.

The present invention overcomes these limitations without need to alter the apparatus except as to supplies of solution to the two stations, with adjustment of the usual controls which measure the quantity of solution injected at each injection stroke.

Apparatus such as referred to above is commercially available and is represented by U.S. Patents Nos. 2,641,990, 2,674,179, 2,645,172, and others.

Figure 2:
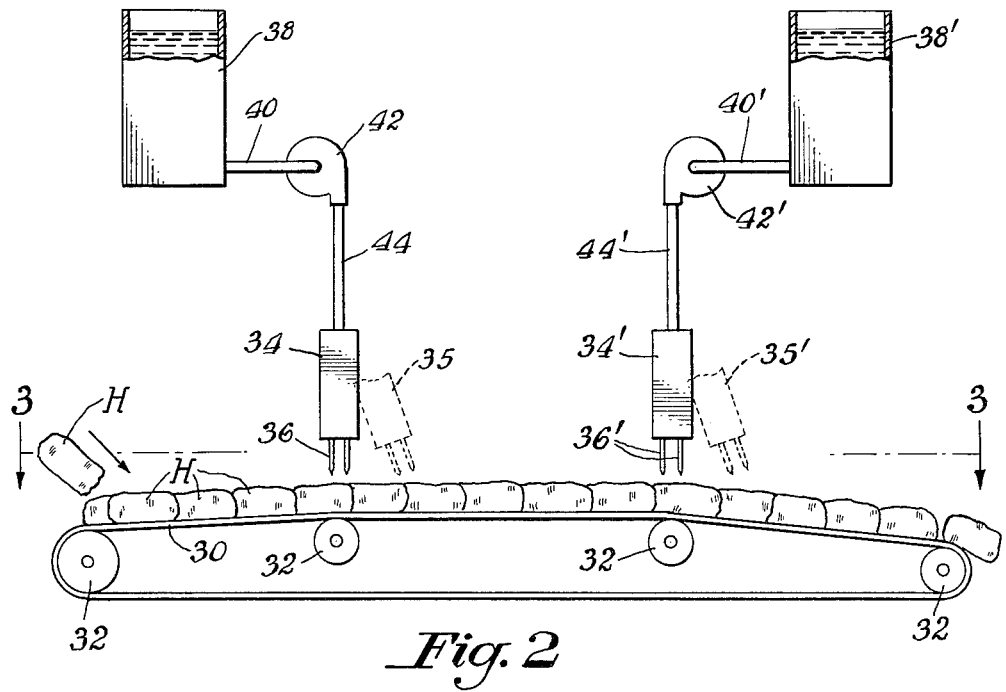
FIG. 2 represents two-station multiple-needle injection of hams with different solutions in a mass production line.
Figure 3:
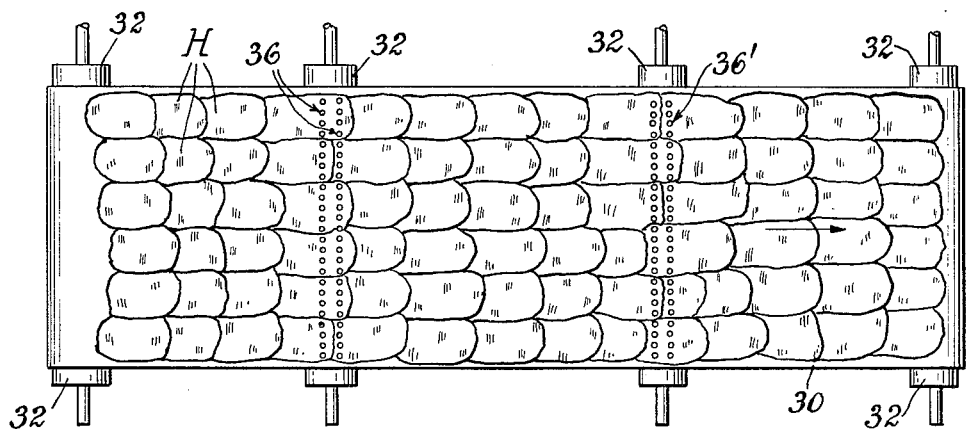
FIG. 3 is a plan view of the apparatus of FIG. 2, taken on line 3—3 of FIG. 2.

In FIG. 2 numeral 30 represents a conveyer moving over driving and supporting rolls 32. Boned hams H are packed on the conveyer at the left in FIG. 2 one ham thick, and carried through the first station.

The first station is represented graphically. Numeral 34 represents a cross-head carrying a bank of needles 36 in two rows (indicated in FIG. 3). The dotted line position 35 represents the advanced position of the cross-head as it is moved by the hams. The valves and volume controls are not shown, as these form no part of the present invention. Numeral 38 represents a tank at Station No. 1 for one solution with conduit means 40 to a pressure pump 42, and conduit means 44 from the pump to the needles 36.

Station No. 2 is identical with the first, the parts being numbered the same, but as prime numbers. Tank 38' contains the second solution.

In operation of the present invention for two-station stitch-pumping, the success in proportioning depends not only upon the controlled proportioning of the two solution, but also on the uniformity of layer of hams H on the conveyer. When the hams after injection are later immersed in a brine which may be comparable to the two solutions mixed, minor departures from exact proportioning of the two solutions for a particular ham are not important, as these are overcome by mutual diffusion of the injected solutions and the bath solution within the ham.

EXAMPLE 4

In the case of stitch-pumping at two stations spaced apart over a moving conveyer, different solutions are used at each station as follows:

|  | Station No. 1, pounds | Station No. 2, pounds |
| --- | --- | --- |
| Water (100 gallons) | 835 |  |
| Sodium hydroxide | 10 |  |
| Sodium nitrite | 2.0 |  |
| Sodium nitrate | 1.62 |  |
| Water [1] |  | 835 |
| Sodium chloride [1] (rock salt) |  | 228 |
| Sodium erythorbate |  | 4.5 |

[1] Together provided as 81.5° Salometer brine.

At Station No. 1, the hams are pumped to 10% increase in weight. At Station No. 2, the hams are again pumped to 12% increase in weight based on the raw ham. After pumping the hams are stored in a brine bath for 24 to 48 hours of the following composition:

Water (100 gallons) _____ lbs__ 835
Sodium chloride _____ lbs__ 75
Sodium nitrite _____ oz__ 12
Sodium nitrate _____ oz__ 8

In the foregoing it is to be observed that the strong alkali is in the meat first, and is in part neutralized by the meat before it is effective to destroy the sodium erythorbate later introduced at the second station. Thus, the prior practice of storing all the pickle content as one solution is avoided, during which storage the sodium erythorbate would be destroyed.

It is also noted in the above that the sodium hydroxide, which is a calcium precipitant, is also in the meat before calcium ions are introduced with the sodium chloride derived from rock salt. Thus, there is no common liquid to be stored, containing the calcium ions and the calcium precipitant, so as to form a precipitate which could plug needles, and affect valves in the two-station procedure.

The immersion of the pumped hams in pickle liquor tends to equalize the fluid pressures inside and outside the ham resulting in final retention of a desired amount of pickle liquor. On removal of the hams they are sealed in cans and cooked in a conventional procedure.

It is to be understood that the invention is not limited to and by the examples as will be clear by the difference in the examples given.

I claim:

1. In the method of treating meat by injecting pickle liquor containing sodium chloride, alkali-metal nitrite, alkaline material in quantity to neutralize lactic acid in the meat and elevate the pH of the meat toward 7 and to increase the water-binding capacity of the resulting cured meat, and ene-diol material subject to gradual destruction when in said liquor having an elevated pH due to the presence of the hereinafter-mentioned selected alkaline material as at least a part of said neutralizing material, the improvement in which the alkaline material includes edible high-pH alkaline material selected from the group consisting of tri-alkali-metal phosphate, alkali-metal hydroxide, normal alkali-metal carbonate, and mixtures theerof, in which said liquor is produced by combining two separate solutions, of which one of said solutions contains all of the ene-diol material and the other of said two solutions contains all of the selected alkali material, and in which the two solutions are substantially simultaneously injected into the piece of meat, whereby upon mixing the two solutions in the meat the acidity of the meat prevents the destructive reaction of the ene-diol material by the high-pH alkaline material.

2. The method of claim 1 in which the selected alkaline agent is alkali-metal hydroxide.

3. The method of claim 1 in which the ene-diol compound is a water-soluble salt of an isomer of ascorbic acid.

4. The method of claim 1 in which the two solutions combine in a conduit which is discharging the combined materials within the meat.

5. The method of claim 1 in which one solution is injected into the piece of meat and in which the second solution is injected into said piece substantially immediately after injecting said first solution.

6. In the method of treating meat by substantially simultaneously injecting two aqueous solutions together forming an alkaline curing liquor containing alkali-metal nitrite and ene-diol material subject to gradual destruction when in solution at elevated pH values and including edible alkaline material in quantity to elevate the pH of the meat toward 7 and to increase the water-binding capacity of the resulting cured meat, the improvement which comprises discharging into the meat successive increments of a first solution containing said ene-diol material and alternately injecting into the meat for combination with said increments substantially at the time of entering the meat successive increments of a second solution containing high-pH alkaline material selected from the group consisting of tri-alkali-metal phosphate, alkali-metal hydroxide, normal alkali-metal carbonate, and mixtures thereof, the increments of said two solutions being in predetermined proportions, whereby upon mixing the two solutions in the meat the acidity of the meat prevents the destructive reaction of the ene-diol material by the high-pH alkaline material.

7. In the method of treating meat by injecting pickle liquor containing sodium chloride, alkali-metal nitrite, alkaline material in quantity to neutralize lactic acid in the meat and elevate the pH of the meat toward 7 and to increase the water-binding capacity of the resulting cured meat, and ene-diol material subject to gradual destruction when in said liquor having an elevated pH due to the presence of the hereinafter-mentioned selected alkaline material as at least a part of said neutralizing material, the improvement in which the alkaline material includes edible high-pH alkaline material selected from the group consisting of alkali-metal hydroxide, normal alkali-metal carbonate, and mixtures thereof, in which said liquor is produced by combining two separate solutions, in which one of said solutions contains all of the ene-diol material and the other of said two solutions contains all of the selected alkali material, and in which the two solutions are substantially simultaneously injected into the piece of meat, whereby upon mixing the two solutions in the meat the acidity of the meat prevents the destructive reaction of the ene-diol material by the high-pH alkaline material.

8. The method of treating a piece of meat which comprises injecting into said piece at a plurality of locations a predetermined quantity, based on the weight of the piece, of one of two solutions, and substantially simultaneously and separately injecting into said piece at a plurality of locations a predetermined quantity, based on the weight of the piece, of a second solution, one of said solutions containing an ene-diol material subject to slow destruction when in solution with the hereinafter-mentioned high-pH alkaline material, the other of said two solutions containing high-pH alkaline material selected from the group consisting of tri-alkali-metal phosphate, normal alkali-metal carbonate, alkali-metal hydroxide, and mixtures thereof, said two solutions in solute and in quantity together in the piece forming a pickle liquor containing sodium chloride, curing salt selected from the group consisting of alkali-metal nitrite, alkali-metal nitrate, and mixtures thereof, said ene-diol compound, and edible alkaline material in amount to neutralize lactic acid in the meat and elevate the pH toward 7, said alkaline material essentially including said high-pH alkaline material, whereby upon mixing the two solutions in the meat the acidity of the meat prevents the destructive reaction of the ene-diol material by the high-pH alkaline material.

9. The method of claim 8 in which the ene-diol compound is sodium erythorbate.

10. The method of claim 9 in which the sodium chloride supplied introduces calcium ions and is present substantially all in one solution, and in which substantially all of the alkaline material precipitates calcium ions from solution and is substantially all present in the other of the two soutions.

11. The method of treating a piece of meat in a traveling succession of pieces of meat which comprises injecting into said piece at a plurality of locations a predetermined quantity, based on the weight of the piece, of one of two solutions, moving the piece to an adjacent station and injecting into said piece at a plurality of locations a predetermined quantity, based on the weight of the piece of a second solution, one of said solutions containing an ene-diol material subject to slow destruction when in solution with the hereinafter-mentioned high-pH alkaline material, the other of said two solutions containing high-pH alkaline material selected from the group consisting of tri-alkali-metal phosphate, normal alkali-metal carbonate, alkali-metal hydroxide, and mixtures thereof, said two solutions in solute and in quantity together in the piece forming a pickle liquor containing sodium chloride, curing salt selected from the group consisting of alkali-metal nitrite, alkali-metal nitrate, and mixtures thereof, said ene-diol material, and edible alkaline material in amount to neutralize lactic acid in the meat and elevate the pH toward 7, said alkaline material essentially including said high-pH alkaline material, whereby upon mixing of the solutions in the meat the acidity of the meat prevents the destructive reaction of the ene-diol material by the high-pH alkaline material.

12. The method of treating a boned ham in a traveling succession of hams which comprises injecting into the ham at a plurality of locations a predetermined quantity, based on the weight of the ham, of one of two solutions, moving the ham to an adjacent station and injecting into said ham at a plurality of locations a predetermined quantity, based on the weight of the ham, of a second solution, one of said solutions containing an ene-diol material subject to slow destruction when in solution with the hereinafter-mentioned high-pH alkaline material, the other of said two solutions containing high-pH alkaline material selected from the group consisting of tri-alkali-metal phosphate, normal alkali-metal carbonate, alkali-metal hydroxide, and mixtures thereof, said two solutions in solute and in quantity together in the ham forming a pickle liquor containing sodium chloride, curing salt selected from the group consisting of alkali-metal nitrite, alkali-metal nitrate, and mixtures thereof, said ene-diol material, and edible alkaline material in amount to neutralize lactic acid in the ham and elevate the pH toward 7, said alkaline material essentially including said high-pH alkaline material, whereby upon mixing of the solutions in the ham the acidity of the meat prevents the destructive reaction of the ene-diol compound by the high-pH alkaline material, sealing the ham in a can, and cooking the ham in the sealed can.

13. The method of claim 12 in which the ene-diol compound is sodium erythorbate.

14. The method of claim 12 in which the sodium chloride supplied introduces calcium ions and is present substantially all in one solution, and in which substantially all of the alkaline material precipitates calcium and is substantially all present in the other of the two solutions.

15. The method of treating a boned ham in a travelling succession of hams which comprises injecting into the ham at a plurality of locations a predetermined quantity, based on the weight of the ham, of one of two solutions, moving the ham to an adjacent station and injecting into said ham at a plurality of locations a predetermined quantity, based on the weight of the ham, of a second solution, one of said solutions containing an ene-diol material subject to slow destruction when in solution with the hereinafter-mentioned high-pH alkaline material, the other of said two solutions containing high-pH alkaline material selected from the group consisting of tri-alkali-metal phosphate, normal alkali-metal carbonate, alkali-metal hydroxide, and mixtures thereof, said two solutions in solute and in quantity together in the ham forming a pickle liquor containing sodium chloride, curing salt selected from the group consisting of alkali-metal nitrite, alkali-metal nitrate, and mixtures thereof, said ene-diol compound, and edible alkaline material in amount to neutralize lactic acid in the ham and elevate the pH toward 7, said alkaline material essentially including said high-pH alkaline material, whereby upon mixing of the solutions in the ham the acidity of the meat prevents the destructive reaction of the ene-diol material by the high-pH alkaline material, immersing the resulting ham in a pickle liquor of sodium chloride and curing salt for 24 to 48 hours, sealing the ham in a can, and cooking the ham in the sealed can.

References Cited by the Examiner

UNITED STATES PATENTS 3,139,347  6/1964  Sair et al. _____ 99—159

FOREIGN PATENTS 1,098,341  1/1961  Germany.
929,554  6/1963  Great Britain.

OTHER REFERENCES

Henrickson et al.: "Food Technology," October 1956, pages 500 to 503, inclusive, article entitled Sodium Ascorbate in Stabilizing Cured Meat Color.

A. LOUIS MONACELL, *Primary Examiner.*
HYMAN LORD, *Examiner.*

UNITED STATES PATENT OFFICE
CERTIFICATE OF CORRECTION

Patent No. 3,231,392　　　　　　　　　　　　　January 25, 1966

Louis Sair

It is hereby certified that error appears in the above numbered patent requiring correction and that the said Letters Patent should read as corrected below.

Column 1, lines 35 and 36, for "phosphoric" read -- phosphorus --; line 50, for "presents" read -- prevents --; line 57, for "copending" read -- cofiled --; line 66, for "from" read -- form --; column 8, line 75, for "solution" read -- solutions --.

Signed and sealed this 27th day of September 1966.

(SEAL)
Attest:

ERNEST W. SWIDER　　　　　　　　　　　　　　EDWARD J. BRENNER
Attesting Officer　　　　　　　　　　　　　　Commissioner of Patents